(12) United States Patent
Kamikawa et al.

(10) Patent No.: US 11,077,709 B2
(45) Date of Patent: Aug. 3, 2021

(54) DRIVE SHAFT AND METHOD FOR PRODUCING DRIVE SHAFT

(71) Applicant: HONDA MOTOR CO., LTD., Tokyo (JP)

(72) Inventors: Mitsuru Kamikawa, Tokyo (JP); Naoto Shibata, Tokyo (JP); Ko Sugai, Tokyo (JP); Masafumi Yamamoto, Tokyo (JP); Takafumi Murakami, Tokyo (JP); Kazuya Kumei, Tokyo (JP); Yutaka Takeuchi, Tokyo (JP); Masaki Kawamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/827,749

(22) Filed: Mar. 24, 2020

(65) Prior Publication Data

US 2020/0307312 A1    Oct. 1, 2020

(30) Foreign Application Priority Data

Mar. 28, 2019   (JP) .............................. JP2019-064267

(51) Int. Cl.
*B60B 35/12* (2006.01)
*B23K 20/12* (2006.01)
(Continued)

(52) U.S. Cl.
CPC ............ *B60B 35/12* (2013.01); *B23K 20/129* (2013.01); *B60B 35/14* (2013.01); *B23K 2101/04* (2018.08); *B60B 2310/208* (2013.01); *B60B 2310/3025* (2013.01); *B60B 2310/54* (2013.01); *B60B 2360/102* (2013.01)

(58) Field of Classification Search
CPC ......... B60B 35/12; B60B 35/00; B60B 35/02; B60B 35/04; B60B 35/14; B60B 2310/208; B60B 2310/302; B60B 2310/3025; B60B 2360/102
See application file for complete search history.

(56) References Cited

U.S. PATENT DOCUMENTS 6,383,311 B1      5/2002 Ochi et al.
2009/0023506 A1   1/2009 Kondo et al.
(Continued)

FOREIGN PATENT DOCUMENTS

CN    103266216       8/2013
JP    2000-154819     6/2000
(Continued)

OTHER PUBLICATIONS

Chinese Office Action and Search Report for Chinese Patent Application No. 202010224690.4 dated Mar. 11, 2021.

*Primary Examiner* — Jason R Bellinger
(74) *Attorney, Agent, or Firm* — Amin, Turocy & Watson, LLP

(57) ABSTRACT

A drive shaft is configured by joining solid stub shafts formed of a medium carbon steel to both ends of a hollow tubular body formed of a medium carbon steel. When expressed as grain size number, the grain size of the hollow tubular body at joint parts where the hollow tubular body and the solid stub shafts are joined together ranges from #5 to #9, and the grain size of the solid stub shafts at the joint parts ranges from #10 to #12.

10 Claims, 10 Drawing Sheets

(51) Int. Cl.
 _B60B 35/14_ (2006.01)
 _B23K 101/04_ (2006.01)

(56) References Cited

U.S. PATENT DOCUMENTS

| | | | |
|---|---|---|---|
| 2010/0062277 A1 | 3/2010 | Sato et al. | |
| 2017/0335445 A1* | 11/2017 | Kuznetsov | F16H 55/06 |
| 2020/0070569 A1* | 3/2020 | Maejima | C22C 38/02 |

FOREIGN PATENT DOCUMENTS

| | | |
|---|---|---|
| JP | 2000-234141 | 8/2000 |
| JP | 2008-087003 | 4/2008 |
| WO | 2006/104023 | 10/2006 |

\* cited by examiner (14)

| | C | Si | Mn | P | S | Cu | Ni | Cr | Mo | Ti | Sol-Al | Sol-B | Nb | [O] | [N] |
|---|---|---|---|---|---|---|---|---|---|---|---|---|---|---|---|
| EXAMPLE 1 | 0.48~0.51 | ≤0.15 | 0.35~0.45 | ≤0.010 | 0.007~0.015 | ≤0.10 | ≤0.10 | ≤0.20 | 0.25~0.35 | 0.025~0.040 | 0.010~0.030 | 0.0010~0.0020 | 0.04~0.070 | ≤0.0015 | ≤0.0060 |
| EXAMPLE 2 | 0.47~0.50 | ≤0.15 | 0.25~0.35 | ≤0.012 | 0.007~0.015 | ≤0.10 | ≤0.10 | ≤0.20 | 0.2~0.3 | 0.025~0.040 | 0.010~0.030 | 0.0010~0.0020 | 0.03~0.060 | ≤0.0015 | ≤0.0060 |
| EXAMPLE 1 | 0.47~0.50 | 0.15~0.25 | 0.60~0.75 | ≤0.015 | 0.010~0.020 | ≤0.20 | ≤0.20 | ≤0.20 | | 0.025~0.040 | 0.010~0.030 | 0.0010~0.0030 | | ≤0.0015 | ≤0.0060 |
| COMPARATIVE EXAMPLE | 0.47~0.50 | ≤0.15 | 0.65~0.75 | ≤0.015 | 0.008~0.015 | ≤0.20 | ≤0.20 | ≤0.20 | | | 0.010~0.030 | 0.0010~0.0020 | | ≤0.0015 | ≤0.0080 |

DRIVE SHAFT AND METHOD FOR PRODUCING DRIVE SHAFT

CROSS-REFERENCE TO RELATED APPLICATION

This application is based upon and claims the benefit of priority from Japanese Patent Application No. 2019-064267 filed on Mar. 28, 2019, the contents of which are incorporated herein by reference.

BACKGROUND OF THE INVENTION

Field of the Invention

The present invention relates to drive shafts for transferring driving force for traveling generated by driving force generating mechanisms to wheels in automobiles and methods for producing such drive shafts.

Description of the Related Art

Drive shafts of automobiles need to be lightweight and, at the same time, need to have excellent stiffness at ends to which, for example, constant velocity joints are attached. To meet these demands, a hollow tubular body is typically used as a shaft portion, and solid stub shafts are joined to the shaft portion (for example, see Japanese Laid-Open Patent Publication No. 2008-087003). The members may be joined together by, for example, friction welding.

SUMMARY OF THE INVENTION

While the thickness of the hollow tubular body corresponds to the difference between the outer diameter and the inner diameter, the thickness of the solid stub shafts corresponds to the diameter. As can be seen from this, the difference between the thicknesses of the hollow tubular body and the solid stub shafts is large. Joined products with such large differences in thickness often crack during hardening.

If hardening conditions are set such that hardened layers with predetermined depths are reliably formed in the solid stub shafts, grains in the hollow tubular body become coarse and cause a decrease in the strength of the hollow tubular body. To avoid this, hardening may not be performed on the hollow tubular body. In this case, however, the outer diameter or thickness of the hollow tubular body needs to be increased to sufficiently increase the strength of the hollow tubular body. Thus, in the case where the hollow tubular body and the solid stub shafts are joined together to produce a drive shaft, it is inconveniently difficult to ensure sufficient strength while reducing the weight.

A general object of the present invention is to provide a drive shaft including a hollow tubular body and a solid stub shaft joined together.

A principal object of the present invention is to provide a drive shaft that is lightweight but exhibits sufficient strength.

Another object of the present invention is to provide a drive shaft production method for obtaining the above-described drive shaft.

According to an embodiment of the present invention, a drive shaft comprises:
  a hollow tubular body formed of a medium carbon steel; and
  solid stub shafts formed of a medium carbon steel and joined to both ends of the hollow tubular body,
wherein, when grain size is expressed as grain size number, grain size of the hollow tubular body at joint parts where the hollow tubular body and the solid stub shafts are joined together ranges from #5 to #9, and grain size of the solid stub shafts at the joint parts ranges from #10 to #12.

Moreover, according to another embodiment of the present invention, a production method for obtaining a drive shaft by joining solid stub shafts formed of a medium carbon steel to both ends of a hollow tubular body formed of a medium carbon steel comprises:
  obtaining the solid stub shafts by cold forging; and
  joining the hollow tubular body and the solid stub shafts together by friction welding, and setting, when grain size is expressed as grain size number, grain size of the hollow tubular body at joint parts where the hollow tubular body and the solid stub shafts are joined together to range from #5 to #9 and setting grain size of the solid stub shafts at the joint parts to range from #10 to #12.

According to the present invention, the grain size numbers at the joint parts where the hollow tubular body and the solid stub shafts are joined together are set to range from #5 to #9 in the hollow tubular body and from #10 to #12 in the solid stub shafts, respectively. By reducing the size of the grains at the joint parts in this manner, a drive shaft with excellent joint strength can be obtained. Moreover, the drive shaft obtained in this manner also exhibits excellent torsional strength and fatigue strength.

In addition, in this case, the weight of the drive shaft can be reduced since the hollow tubular body has an empty space inside.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 shows the compositions of the medium carbon steels of Examples 1 to 3;

DESCRIPTION OF THE PREFERRED EMBODIMENTS

A preferred embodiment of a drive shaft according to the present invention will be described in detail below with reference to the accompanying drawings, in relation to a method for producing the drive shaft.

Figure 1:
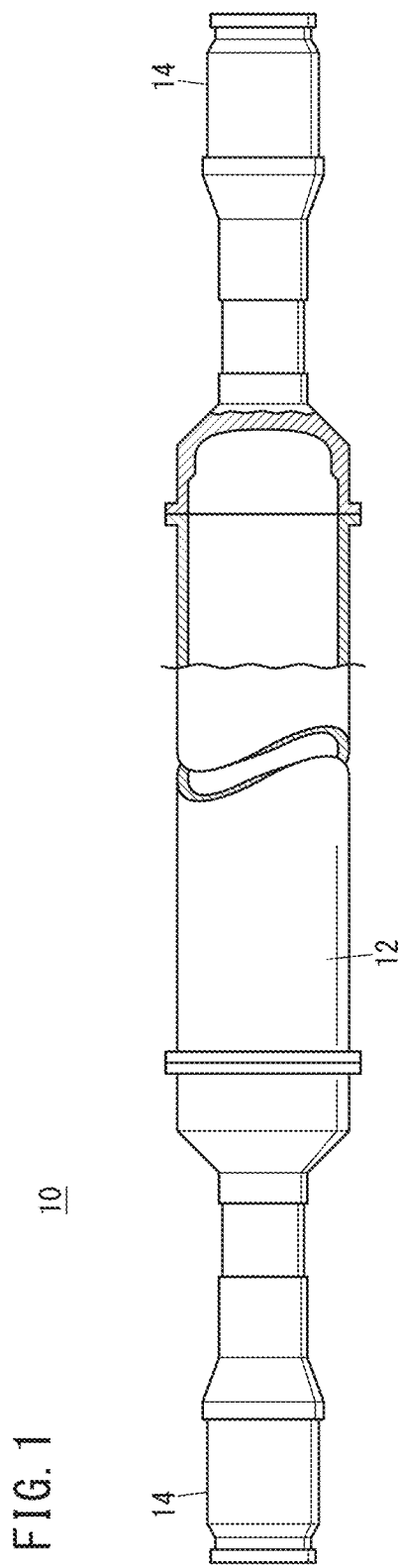
FIG. 1 is a side view, partially sectioned in a longitudinal direction, of a drive shaft according to an embodiment of the present invention.

FIG. 1 is a side view, partially sectioned in a longitudinal direction, of a drive shaft 10 according to an embodiment of the present invention. The drive shaft 10 includes a hollow tubular body 12 and solid stub shafts 14 disposed at both ends of the hollow tubular body 12.

In this embodiment, the hollow tubular body 12 is formed of a medium carbon steel. As a suitable example, the medium carbon steel contains, by weight, 0.43-0.47% carbon (C), 0.20% or less silicon (Si), 0.60-0.90% manganese (Mn), 0.010% or less phosphorus (P), 0.008-0.020% sulfur (S), 0.1% or less copper (Cu), 0.1% or less nickel (Ni), 0.05% or less chromium (Cr), at least one of 0.05% or less molybdenum (Mo), 0.01-0.03% niobium (Nb), and 0.01-0.05% titanium (Ti), and 0.02-0.04% aluminum (Al), and a balance of iron (Fe) and unavoidable impurities. Moreover, when expressed as grain size number, the grain size of the medium carbon steel ranges from #4 to #9.

The solid stub shafts 14 are also formed of a medium carbon steel. As a suitable example, the medium carbon steel contains, by weight, 0.45-0.51% C, 0.25% or less Si, 0.30-0.50% Mn, 0.015% or less P, 0.008-0.020% S, 0.2% or less Cu, 0.1% or less Ni, 0.1-0.2% Cr, at least one of 0.05-0.25% Mo, 0.03-0.08% Nb, and 0.01-0.05% Ti, 0.02-0.04% Al, and 10-30 ppm boron (B), and a balance of Fe and unavoidable impurities.

That is, the medium carbon steel serving as the material of the solid stub shafts 14 contains more Mo, Nb, and/or Ti compared with the medium carbon steel serving as the material of the hollow tubular body 12. Moreover, when expressed as grain size number, the grain size of the medium carbon steel making up the solid stub shafts 14 ranges from #9 to #11.

Figure 2:
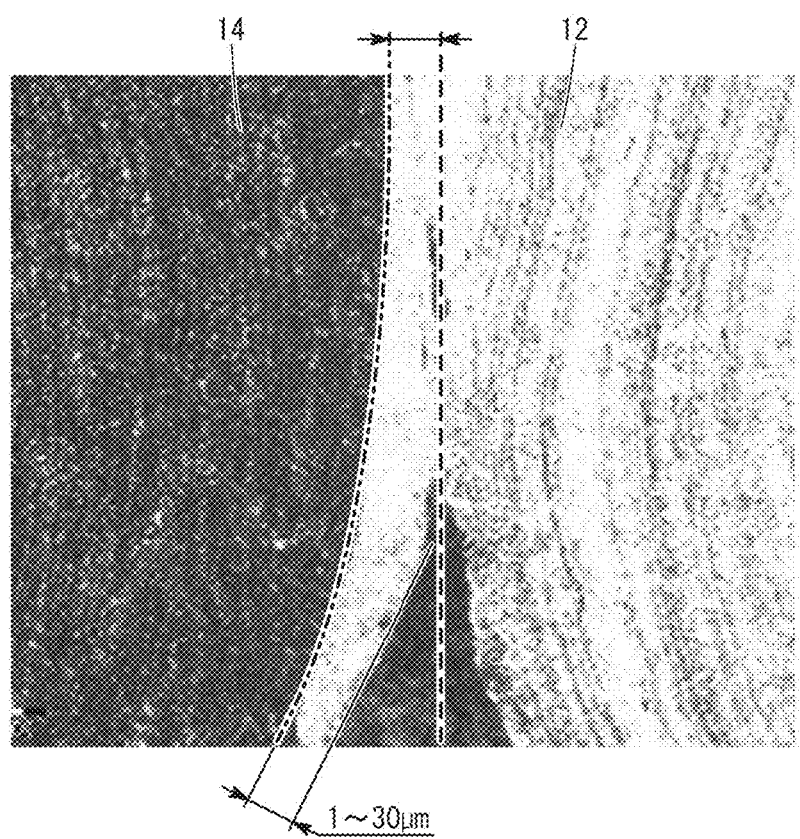
FIG. 2 is a photomicrograph showing an area adjacent to a joint part of a hollow tubular body and a solid stub shaft.

FIG. 2 is a photomicrograph showing an area adjacent to a joint part of the hollow tubular body 12 and one of the solid stub shafts 14. The broken line in FIG. 2 indicates the joint interface. The hollow tubular body 12 and the solid stub shafts 14 are joined together by friction welding (described below). As is clear from FIG. 2, part of the hollow tubular body 12 deformed to penetrate into (become entangled in) the solid stub shaft 14.

The thickness of the penetrating part (amount of penetration) of the hollow tubular body 12 is preferably 1-30 μm. If the amount of penetration is less than 1 μm, the joint strength may be insufficient. On the other hand, if the amount of penetration is more than 30 μm, the hollow tubular body 12 may crack and break. A preferred amount of penetration of the hollow tubular body 12 is about 15 μm.

Figure 3:
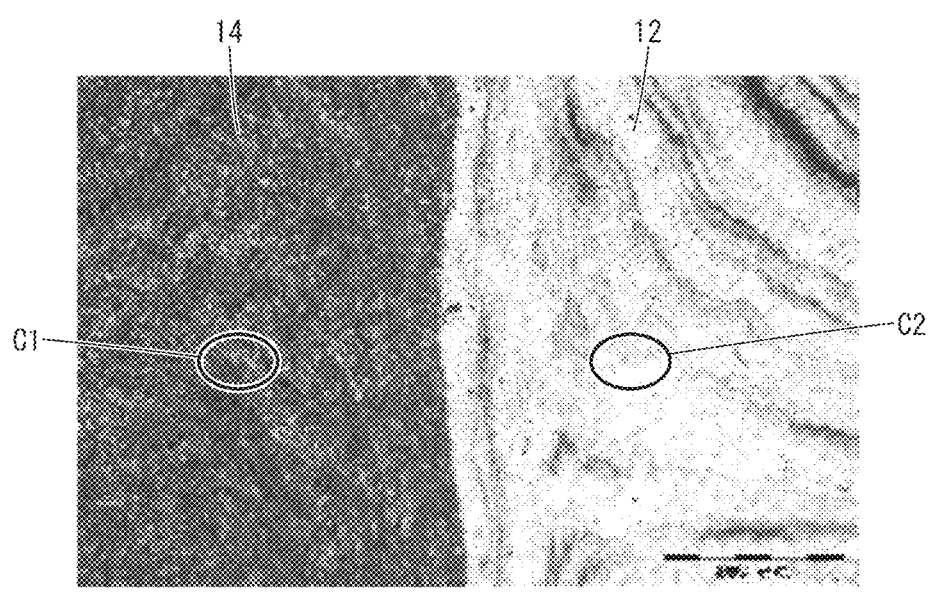
FIG. 3 is a photomicrograph showing an area adjacent to the joint part.
Figure 4:
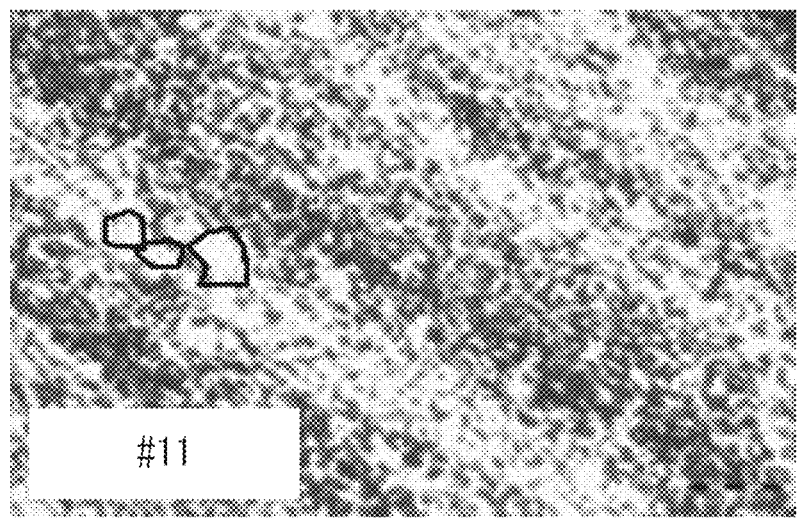
FIG. 4 is an enlarged photomicrograph of a principal part indicated by C1 in FIG. 3.
Figure 5:
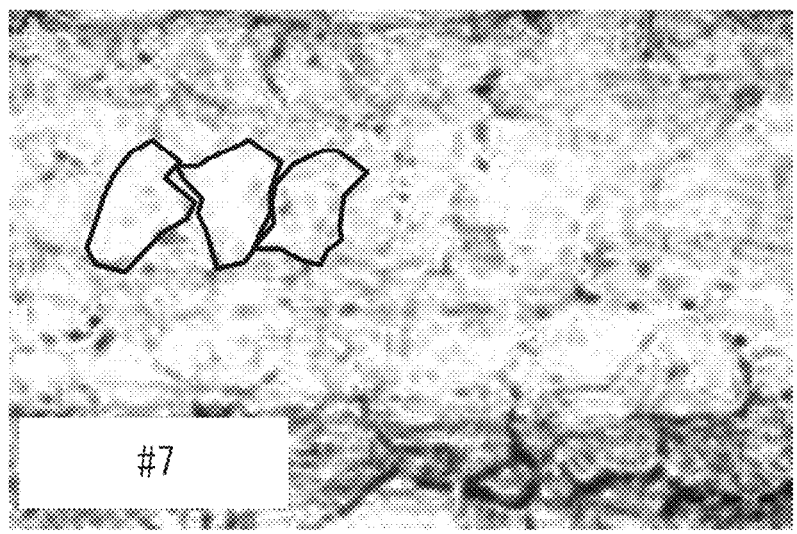
FIG. 5 is an enlarged photomicrograph of a principal part indicated by C2 in FIG. 3.

FIG. 3 is another photomicrograph showing an area adjacent to the joint part. Furthermore, FIGS. 4 and 5 are enlarged photomicrographs of principal parts respectively indicated by C1 and C2 in FIG. 3. The contour lines in FIGS. 4 and 5 indicate grain boundaries. When expressed as grain size number, the grain sizes of the hollow tubular body 12 and the solid stub shafts 14 determined on a basis of the magnification of the photomicrographs and the dimensions of the contour lines ranged from #5 to #9 and from #10 to #12, respectively. It is clear from the results that the grains of both the solid stub shafts 14 and the hollow tubular body 12 became finer in the area adjacent to the joint part.

As a result of an analysis of areas adjacent to the grain boundaries, the presence of $Mo_2C$, NbC, and TiC serving as precipitated particles was found. From this, it can be surmised that $Mo_2C$, NbC, and TiC prevented grain growth. Moreover, $Mo_2C$, NbC, and TiC prevent formation of $Fe_3C$, which is a brittle substance, and thereby improve the strength of grain boundaries. Thus, when the drive shaft 10 is subjected to tensile testing, it is not the joint part but the hollow tubular body 12 that breaks.

Figure 6:
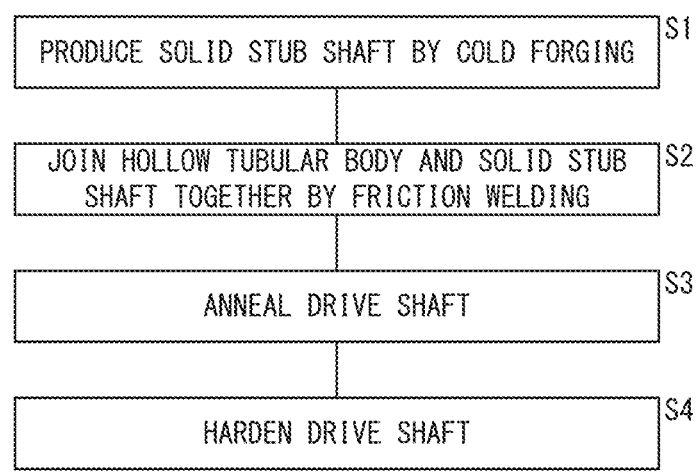
FIG. 6 is a schematic flow diagram of a method for producing a drive shaft according to an embodiment of the present invention.

Next, a method for producing the drive shaft 10 according to an embodiment will be described on a basis of a schematic flow diagram illustrated in FIG. 6. The production method includes a stub production step S1 of obtaining the solid stub shafts 14, a joint step S2 of joining the hollow tubular body 12 and the solid stub shafts 14 together, an annealing step S3, and a hardening step S4.

As described above, the medium carbon steel containing, by weight, 0.45-0.51% C, 0.25% or less Si, 0.30-0.50% Mn, 0.015% or less P, 0.008-0.020% S, 0.2% or less Cu, 0.1% or less Ni, 0.1-0.2% Cr, at least one of 0.05-0.25% Mo, 0.03-0.08% Nb, and 0.01-0.05% Ti, 0.02-0.04% Al, and 10-30 ppm B, and a balance of Fe and unavoidable impurities, is preferred as a material for obtaining the solid stub shafts 14. When expressed as grain size number, the grain size of the medium carbon steel ranges from #9 to #11.

The steel material composed of the medium carbon steel with the above-described composition is rolled at a temperature of 850° C. or less. Due to the rolling in the temperature range, strain remains in the steel material. In addition, transformation from austenite to ferrite occurs, and ferrite precipitates from uneven parts in which the strain remains. This results in a soft structure that includes fine grains and that can be easily shaped.

Subsequently, the steel material is spheroidized. To do this, for example, the steel material may be kept at 720-760° C. for a predetermined period of time and then cooled slowly at a cooling speed of 0.5° C./min down to 600° C. This promotes spheroidization of cementite ($Fe_3C$), and thus the steel material obtains a structure containing a significant amount of relatively soft ferrite.

Next, the spheroidized steel material is cold-forged in the stub production step S1. In cold forging, grains can be prevented from becoming coarser. In other words, the grains are kept fine before and after cold forging. In addition, the solid stub shafts 14 can be easily shaped even by cold forging since the steel material is soft.

Next, the joint step S2 is performed. In this step, friction welding is performed so that members are pressure-welded to each other. To do so, either the solid stub shaft 14 or the hollow tubular body 12 is rotated while being held by a holder, and a thrust force is applied to a holder holding the other. Conditions such as the rotational speed and the thrust force are set such that the surface temperature during joining reaches 800-870° C.

As described above, the medium carbon steel containing, by weight, 0.43-0.47% C, 0.20% or less Si, 0.60-0.90% Mn, 0.010% P, 0.008-0.020% S, 0.1% or less Cu, 0.1% or less Ni, 0.05% or less Cr, at least one of 0.05% or less Mo, 0.01-0.03% Nb, 0.01-0.05% Ti, and 0.02-0.04% Al, and a balance of Fe and unavoidable impurities, is preferred as a material for the hollow tubular body 12. When expressed as grain size number, the grain size of the medium carbon steel ranges from #4 to #9.

When the solid stub shafts 14 containing Mo, Nb, and/or Ti as described above is joined to the hollow tubular body 12 formed of the above-described medium carbon steel by friction welding, at least one of $Mo_2C$, NbC, and TiC precipitates in the grain boundaries. This prevents formation of $Fe_3C$, resulting in an improvement in the strength of the grain boundaries.

Next, the annealing step S3 is performed. That is, the drive shaft 10 is heated to a predetermined temperature. The annealing removes the strain that has occurred during friction welding and promotes recrystallization. The recrystallized grains become as fine as about 20 µm. Moreover, NbC, VC, $Mo_2C$, or the like also precipitate in the grain boundaries by annealing. Due to the finer grains and the precipitation of carbides in the grain boundaries, the joint parts attain an excellent strength. It is preferable that the annealing temperature be in the range of 650 to 720° C. and maintained for 30 to 90 minutes.

Next, the hardening step S4 is performed after predetermined machine work for shaping is performed on the drive shaft 10. In this step, induction hardening is preferably performed as it has various advantages such as excellent thermal efficiency.

Figure 7:
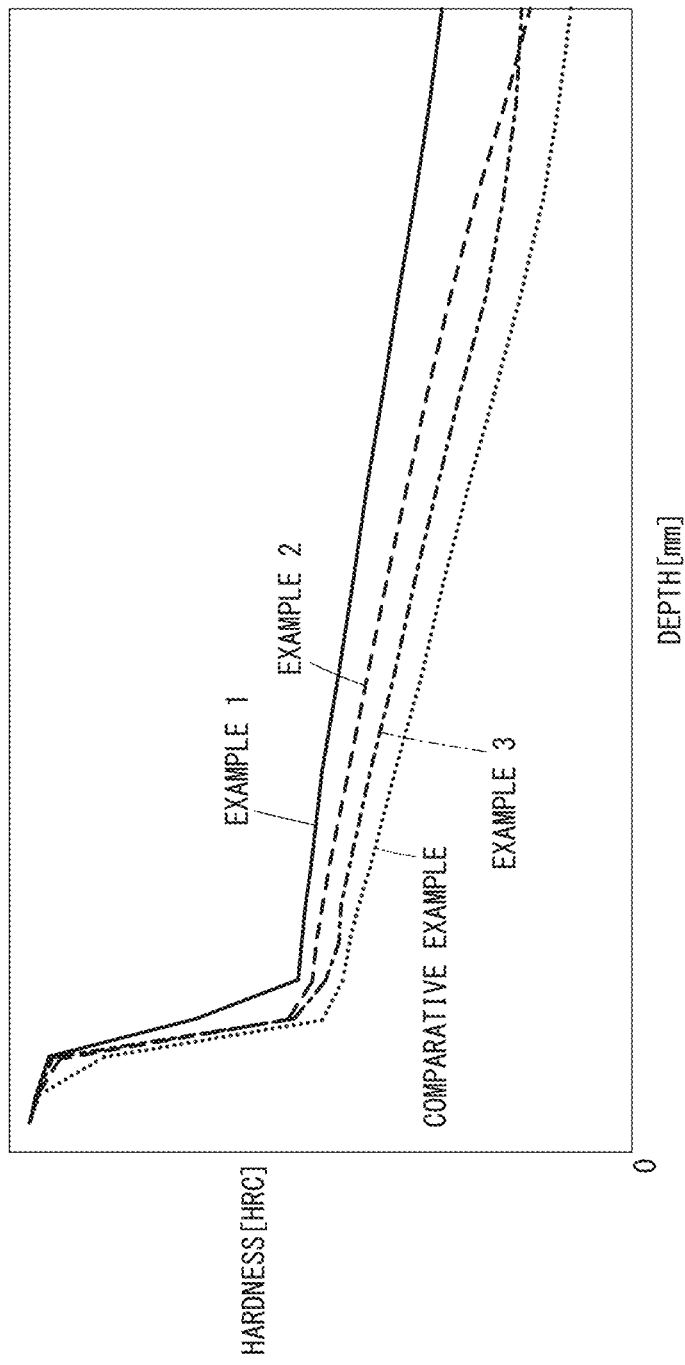
FIG. 7 is a graph showing relationships between the depth and the Rockwell hardness (C scale; HRC) of a typical medium carbon steel (comparative example) and medium carbon steels (Examples 1 to 3) with predetermined compositions after being subjected to induction hardening under identical conditions.

In this embodiment, the overall drive shaft 10 can be hardened. Here, hardening progresses easily in the solid stub shafts 14 formed of the medium carbon steel with the above-described composition compared with other medium carbon steels. This will be explained with a specific example below. FIG. 7 shows measurement results of Rockwell hardness (C scale; HRC) of a typical medium carbon steel (comparative example) and medium carbon steels (Examples 1 to 3) with the above-described compositions after being subjected to induction hardening under identical conditions. The abscissa represents the depth, and the ordinate represents the HRC. Moreover, the specific compositions of Examples 1 to 3 are shown in FIG. 8. Here, "Sol-" in FIG. 8 indicates that the element is a solid solution.

As illustrated in FIG. 7, all the medium carbon steels of Examples 1 to 3 exhibit higher hardness than the medium carbon steel according to a known technology serving as the comparative example. It is apparent from the above that hardening progressed more easily in Examples 1 to 3 than in the known technology and that hardened layers were sufficiently formed.

Thus, in this embodiment, hardened layers with predetermined depths can be reliably formed in the solid stub shafts 14 even when hardening is performed under conditions where hardened layers with sufficient depths are formed in the hollow tubular body 12. This is because the medium carbon steel serving as the material of the solid stub shafts 14 has excellent hardenability as described above. That is, grains in the structure of the hollow tubular body 12 subjected to hardening are prevented from becoming coarse. Consequently, by hardening, the strength of the hollow tubular body 12 can be improved while the grains are prevented from becoming coarse.

Thus, the strength of the hollow tubular body 12 does not need to be increased by increasing the outer diameter or thickness of the hollow tubular body 12 instead of performing hardening. The weight of the drive shaft 10 can be reduced accordingly. Moreover, since the hollow tubular body 12 is not exposed to excessive heating, quenching cracks in the drive shaft 10 can be prevented.

In addition, the drive shaft 10 includes fine grains in the joint parts and carbides precipitating in the grain boundaries. The carbides produce a so-called particle dispersion strengthening effect. For the above-described reasons, the joint parts have excellent strength and toughness.

Figure 9:
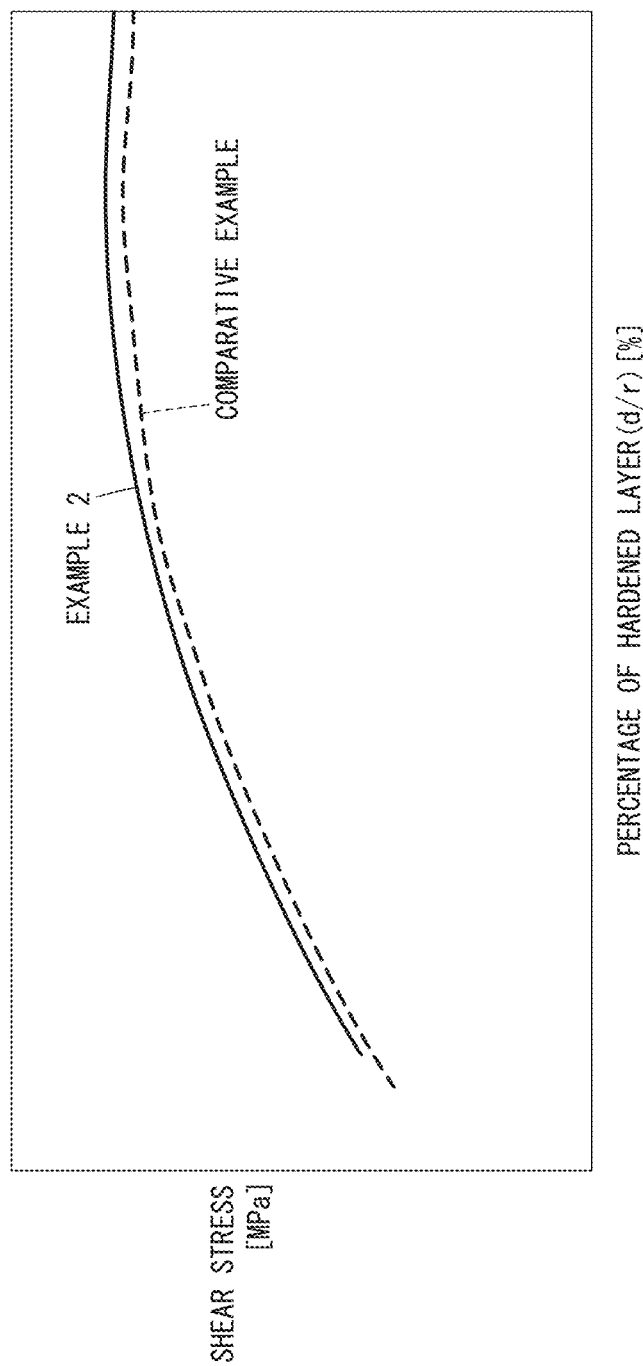
FIG. 9 is a graph showing results of static destructive testing performed on the medium carbon steel in Example 2 and the medium carbon steel in the comparative example.
Figure 10:
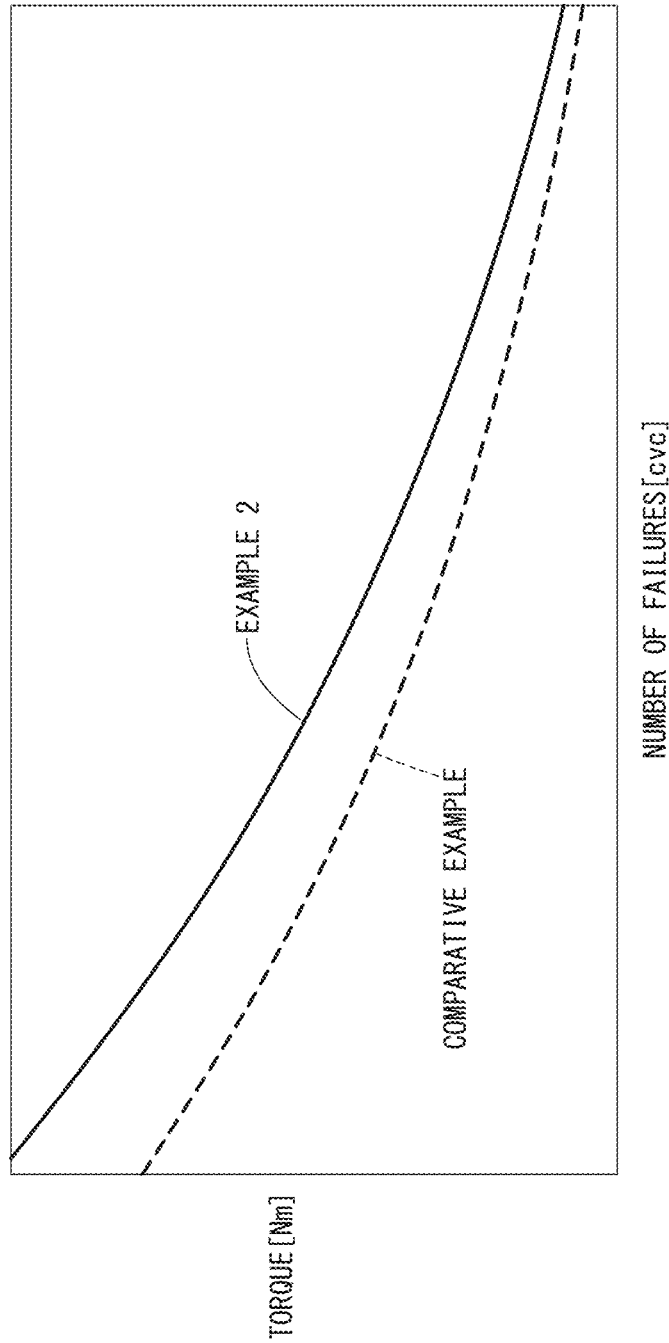
FIG. 10 is a graph showing results of fatigue testing performed on the medium carbon steel in Example 2 and the medium carbon steel in the comparative example.

Furthermore, results of static destructive testing performed on the medium carbon steel in Example 2 and the medium carbon steel in the comparative example are shown in FIG. 9. In addition, FIG. 10 shows results of fatigue testing performed on the medium carbon steel in Example 2 and the medium carbon steel in the comparative example. As is clear from FIGS. 9 and 10, the medium carbon steel in Example 2 exhibits excellent shear stress and fatigue strength compared with the medium carbon steel of the known technology. That is, the solid stub shafts 14 exhibit excellent shear stress and fatigue strength.

Thus, when the drive shaft 10 is subjected to tensile testing, it is not the joint parts but the hollow tubular body 12 that breaks.

Moreover, since the hollow tubular body 12 is lightweight, the weight of the drive shaft 10 can be reduced. That is, in this embodiment, although the hollow tubular body 12 and the solid stub shafts 14 are joined together, the drive shaft 10 has a sufficient strength while the weight is reduced.

The present invention is not limited in particular to the embodiments described above, and various modifications can be made thereto without departing from the scope of the present invention.

What is claimed is:

1. A drive shaft comprising:
   a hollow tubular body formed of a medium carbon steel; and
   solid stub shafts formed of a medium carbon steel and joined to both ends of the hollow tubular body,
   wherein, when grain size is expressed as grain size number, grain size of the hollow tubular body at joint parts where the hollow tubular body and the solid stub shafts are joined together ranges from #5 to #9, and grain size of the solid stub shafts at the joint parts ranges from #10 to #12.

2. The drive shaft according to claim 1, wherein the medium carbon steel serving as a material of the solid stub shafts contains, by weight, 0.45-0.51% C, 0.25% or less Si, 0.30-0.50% Mn, 0.015% or less P, 0.008-0.020% S, 0.2% or less Cu, 0.1% or less Ni, 0.1-0.2% Cr, at least one of 0.05-0.25% Mo, 0.03-0.08% Nb, and 0.01-0.05% Ti, 0.02-0.04% Al, and 10-30 ppm B, and a balance of Fe and unavoidable impurities, and the grain size number of the medium carbon steel ranges from #9 to #11.

3. The drive shaft according to claim 2, wherein at least one of NbC, $Mo_2C$, and TiC precipitates in a grain boundary in metallic structure of the solid stub shafts.

4. The drive shaft according to claim 1, wherein the medium carbon steel serving as a material of the hollow tubular body contains, by weight, 0.43-0.47% C, 0.20% or less Si, 0.60-0.90% Mn, 0.010% or less P, 0.008-0.020% S, 0.1% or less Cu, 0.1% or less Ni, 0.05% or less Cr, at least one of 0.05% or less Mo, 0.01-0.03% Nb, and 0.01-0.05% Ti, and 0.02-0.04% Al, and a balance of Fe and unavoidable impurities, and the grain size number of the medium carbon steel ranges from #4 to #9.

5. The drive shaft according to claim 1, wherein part of the hollow tubular body penetrates into the solid stub shafts by a thickness of 1-30 µm at the joint parts.

6. A production method for obtaining a drive shaft by joining solid stub shafts formed of a medium carbon steel to both ends of a hollow tubular body formed of a medium carbon steel, the production method comprising:
   obtaining the solid stub shafts by cold forging; and joining the hollow tubular body and the solid stub shafts together by friction welding, and setting, when grain size is expressed as grain size number, grain size of the hollow tubular body at joint parts where the hollow tubular body and the solid stub shafts are joined together to range from #5 to #9 and setting grain size of the solid stub shafts at the joint parts to range from #10 to #12.

7. The production method according to claim 6, wherein, during the friction welding, the solid stub shafts and the hollow tubular body rotating relative to each other are brought into contact, a thrust force is applied by a thrust force applying device to the hollow tubular body or the solid stub shafts such that the solid stub shafts are relatively pressed against the hollow tubular body to generate frictional heat to soften the hollow tubular body and the solid stub shafts, and then additional thrust force is applied to join the hollow tubular body and the solid stub shafts together by solid phase joining.

8. The production method according to claim 6, wherein the medium carbon steel used as a material for the solid stub shafts contains, by weight, 0.45-0.51% C, 0.25% or less Si, 0.30-0.50% Mn, 0.015% or less P, 0.008-0.020% S, 0.2% or less Cu, 0.1% or less Ni, 0.1-0.2% Cr, at least one of 0.05-0.25% Mo, 0.03-0.08% Nb, and 0.01-0.05% Ti, 0.02-0.04% Al, and 10-30 ppm B, and a balance of Fe and unavoidable impurities, and the grain size number of the medium carbon steel ranges from #9 to #11.

9. The production method according to claim 8, further comprising:
    annealing the drive shaft at a temperature of 650-720° C. for 30-90 minutes after the joining by friction welding; and
    hardening the drive shaft after the annealing,
    wherein at least one of NbC, $Mo_2C$, and TiC is precipitated in a grain boundary in metallic structure of the solid stub shafts.

10. The production method according to claim 6, wherein the medium carbon steel used as a material for the hollow tubular body contains, by weight, 0.43-0.47% C, 0.20% or less Si, 0.60-0.90% Mn, 0.010% or less P, 0.008-0.020% S, 0.1% or less Cu, 0.1% or less Ni, 0.05% or less Cr, at least one of 0.05% or less Mo, 0.01-0.03% Nb, and 0.01-0.05% Ti, and 0.02-0.04% Al, and a balance of Fe and unavoidable impurities, and the grain size number of the medium carbon steel ranges from #4 to #9.

* * * * *